United States Patent [19]

Nishii et al.

[11] Patent Number: 5,124,100
[45] Date of Patent: Jun. 23, 1992

[54] DRY GRANULATING METHOD AND APPARATUS

[75] Inventors: Kazuo Nishii, Yokohama; Yoshihiro Itoh, Sayama; Noboru Kawakami, Mitoshi; Nobuharu Moriya, Osaka, all of Japan

[73] Assignee: Fuji Paudal Kabushiki Kaisha, Osaka, Japan

[21] Appl. No.: 610,355

[22] Filed: Nov. 7, 1990

[30] Foreign Application Priority Data

Nov. 17, 1989 [JP] Japan .................. 1-297619
Aug. 16, 1990 [JP] Japan .................. 2-215024

[51] Int. Cl.⁵ .................. B29C 67/02; B29B 9/08
[52] U.S. Cl. .................. 264/82; 23/313 R; 23/313 FB; 264/40.1; 264/40.3; 264/101; 264/117; 425/140; 425/222
[58] Field of Search .............. 264/40.1, 40.3, 82, 264/83, 101, 102, 117, 15; 425/140, 149, 222; 23/313 R, 313 PB

[56] References Cited

U.S. PATENT DOCUMENTS

| | | | |
|---|---|---|---|
| 2,586,818 | 2/1952 | Harms | 23/313 FB |
| 2,689,973 | 9/1954 | Lee et al. | 23/313 FB |
| 3,735,498 | 5/1973 | Suzukawa et al. | 23/313 FB |
| 3,927,988 | 12/1975 | Frazier | 264/102 |
| 4,820,463 | 4/1989 | Raufast | 264/102 |
| 4,980,106 | 12/1990 | Vogel | 264/102 |

OTHER PUBLICATIONS

Journal of Chemical Engineering of Japan, "Fluidization State of Ultrafine Powders", Morooka, Kusakabe, Kobata & Kato, vol. 21, No. 1, 1988, pp. 41–46.
"The Use of Gas Pressure Gradients to Control Powder Packing Density", by A. G. McLean et al.
"Apparent Size of Agglomerates in Fluidized Beds of Submicron Powders", by S. Chiba, et al.
Powder Technology, 43 (1985) 117–125, "Effect of Interparticle Forces on the Hydrodynamic Behavior of Fluidized Aerogels", by J. Chaouki et al.

Primary Examiner—Mary L. Theisen
Attorney, Agent, or Firm—Shefte, Pinckney & Sawyer

[57] ABSTRACT

Uniform spherical granules are produced from powder raw material without utilizing an agglomerating liquid by repeatedly and alternately compacting a dry powder raw material within a granulating vessel to cohesively form agglomerates of the material and fluidizing the powder material within the vessel to break up and form the agglomerates gradually into a uniform spherical shape.

39 Claims, 5 Drawing Sheets

DRY GRANULATING METHOD AND APPARATUS

BACKGROUND OF THE INVENTION

The present invention relates generally to granulating methods and apparatus for forming powder materials into granules and, more particularly, to a novel method and apparatus by which substantially spherical granules of a substantially uniform size may be formed from a powder material substantially without applying an agglomerating liquid or binder.

In various and diverse technologies, raw material processing conventionally requires the initial processing of raw material in powder form into larger agglomerated granules which may be more easily handled. Preferably, such agglomerated granules should be substantially spherical in shape and as uniform as possible in composition and density for ease of flowability and handling of the granules and to enhance the quality of end products formed therefrom. On the other hand, it is desirable that such granules be adapted for relatively easy disintegration back into powder form when the granules are to be subjected to further processing, e.g., mixing, kneading, or pressing operations or the like.

Various forms of granulating apparatus have been developed over past years. In granulating apparatus of the type commonly referred to as pan granulators or rotating drum granulators, a charge of powder material is continuously subjected to a rolling and cascading motion within the granulator vessel while a liquid binder is introduced to adhere the powder material. As the rolling and cascading motion of the powder material continues, the material is formed into generally spherical granules. However, disadvantageously, the granules produced in this type of granulating apparatus vary in granule diameter over a relatively wide range, e.g., between granules of several millimeters and granules of several centimeters. Accordingly, it is difficult in the use of such apparatus to obtain granules of smaller diameters, e.g., below several millimeters, and also to obtain uniformity in the size of granules produced. Further, problems may be encountered in the operation of this type of granulating apparatus in controlling the moisture content of the granules, which contributes to the wide range in granule size.

In spray drying granulators, commonly referred to as spray dryers, a slurry composed of powder raw material and a binder or other agglomerating liquid is continuously sprayed in droplet or globular form into a vessel while heated drying air is directed through the vessel to drive off the agglomerating liquid, thereby transforming the globules into essentially dry granules of the powder material.

While this apparatus and method produces generally uniform spherical granules with acceptable flowability characteristics, it is difficult to produce relatively dense granules due to the heat-induced evaporation of the agglomerating liquid which tends to cause outward migration of the finer particles of the powder material toward the granule surface. Accordingly, the granules produced are often hollow and of relatively low density for their volume. Further, problems may be encountered in achieving consistent homogeneity and powder material content in the preparation of the slurry for this type of apparatus. The overall size of spray dryers is relatively large and therefore not generally suitable for frequent material changes because of the necessity and difficulty of cleaning the entire apparatus system.

Extruding machinery is also available for forming moistened powder material into generally cylindrical pellet-type form by the forced extrusion of the material through a die or screen. Disadvantageously, it is difficult to produce pelletized granules by this operation which are less than about one millimeter in diameter. Moreover, the cylindrical shape of the pellets significantly restricts their flowability and, as a result, such pellets are often further processed in a spheronizing vessel wherein the pellets are repetitively beaten against the vessel walls by a rotating plate to deform and plasticize the pellets into spherical form.

Fluidized bed granulating machines have been developed which essentially combine the functions of an extruder, a spheronizer and a dryer for granule formation. In such apparatus, powder raw material is fed into a cylindrical vessel having a stationary screen or plate with openings therethrough, the powder material being treated with an agglomerating liquid spray on the charge side of the screen or plate while heated drying air is forced through the screen or plate openings from the opposite side thereof to form the powder into dry granules. Disadvantageously, such granulating apparatus produce a widely varying range of granule shapes and sizes which inhibit good flowability of the granules.

In another form of agitative-type granulating apparatus, a charge of powder material is processed in batch form in a vessel having driven rotors for circulating and mixing the powder charge material, with an agglomerating liquid spray being provided for forming the powder material into granules as circulation progresses. Hereagain, the granules produced by such apparatus typically range widely in granule size and, further, the apparatus is poorly capable of accurate repeatable control of granule size.

Other machines are available for compacting powder material mechanically between a pair of rollers to form relatively dense granules or brickettes. However, the granules or brickettes produced by these apparatus also range widely in cross-sectional dimension from several millimeters to several centimeters and are generally of a non-spherical shape.

SUMMARY OF THE INVENTION

It is accordingly an object of the present invention to provide an improved granulating apparatus capable of producing solid, i.e., not hollow, granules of relatively high density which are substantially spherical in shape and of a substantially uniform diameter. More specifically, an object of the present invention is to produce uniform granules in a smaller range of sizes than the prior art apparatus are capable, e.g., of a diameter of about one millimeter or less.

It is a further object of the present method and apparatus to produce granules directly from dry powder materials substantially without use of an agglomerating liquid or other binder, so as to produce relatively soft granules which are easily disintegrated into the constituent powder material when used in subsequent processes or operations.

The present apparatus and method has as a further object the capability of controlling granule size and density by control of operational parameters of the apparatus and method.

Briefly summarized, the granulating method of the present invention basically involves the steps of initially charging a granulating vessel with a quantity of substantial dry powder material, compressively compacting the powder material within the vessel into cohesive agglomerates, preferably by conveying a gaseous fluid within the vessel, and fluidizing the powder material within the vessel, preferably also by conveying a gaseous fluid within the vessel, for circulating the powder material to form the agglomerates gradually into a substantially spherical shape, all substantially without the addition of an agglomerating liquid. Compaction and fluidization of the powder material within the vessel preferably take place alternately, compaction being performed at least once and more preferably in repeated alternation with fluidization of the powder material as necessary or desirable to achieve greater uniformity of granule size.

In the preferred embodiment of the present method, the same gaseous fluid is utilized both for compacting and fluidizing the powder material. As necessary or desirable, the fluidizing or compacting gaseous fluid or both may have a predetermined moisture content. For example, the gaseous fluid may be air, nitrogen or another inert gas with a predetermined content of water vapor or an organic solvent vapor. In some embodiments, a common quantity of gaseous fluid is continuously recirculated for use in performing both the compressing and fluidizing steps of the method.

It is further preferred that the granulating vessel have a work surface which supports the powder material during processing, compaction of the powder material being accomplished by causing the gaseous fluid to flow in a direction for compressing the powder material against the work surface and fluidizing of the powder material being accomplished by causing the gaseous fluid to flow in the opposite or another direction to transiently suspend and circulate the powder material above the work surface. Compression of the powder material may be accomplished by directing a pressurized flow of the gaseous fluid into the vessel or by suction drawing of a flow of the gaseous fluid into the vessel. Likewise, the fluidizing of the powder material may be accomplished by either a pressurized or suction flow of the gaseous fluid into the vessel. The powder material within the vessel may also be mechanically agitated as part of the fluidizing step.

According to one aspect of the present method, the average size, shape and uniformity of the granules produced may be controlled by controlling the interval between successive performances of the compacting step of the method, the elapsed time of each compacting step, and the total elapsed time of the overall method. Other operational parameters may also be adjusted for the same purpose, such as the flow rate of the fluidizing gaseous fluid and the compacting pressure of the compacting gaseous fluid.

The granulating apparatus of the present invention basically includes a granulating vessel adapted for containing a quantity of substantially dry powder material, a suitable arrangement for compressively compacting the powder material within the vessel into cohesive agglomerates, a suitable arrangement for fluidizing the powder material within the vessel for circulating the powder material to form the agglomerates gradually into a substantially spherical shape and a substantially uniform size, and a control device or arrangement for repeatedly actuating and deactivating the compacting arrangement and the fluidizing arrangement alternately.

Preferably, the vessel is a fluidized bed granulating vessel of the type having a work surface on which the powder material is supported. The compacting arrangement is adapted to cause a gaseous fluid flow in a direction to compress the powder material against the work surface while the fluidizing arrangement is adapted to cause another gaseous fluid flow in a direction to transiently suspend and circulate the powder material above the work surface.

In one embodiment of the apparatus, the work surface comprises a screen disposed generally horizontally in the vessel for defining with the vessel a work area above the screen. In such embodiment, the compacting gaseous flow is directed downwardly against the powder material supported on the screen while the fluidizing gaseous flow is oppositely directed upwardly through the screen.

In an alternate embodiment of the apparatus, the work surface comprises a generally concave bottom interior wall of the vessel. The compacting arrangement is adapted to direct its gaseous fluid flow downwardly to compress the powder material against the bottom vessel wall, while the fluidizing arrangement is operative to deflect its gaseous fluid flow off the bottom vessel wall to upwardly fluidize the powder material. In this embodiment, the fluidizing arrangement includes a grid of fluid discharge pipes having multiple fluid discharge openings oriented angularly with respect to the concave bottom wall.

A filter, cyclone-type dust collector or another suitable device may be provided for collecting airborne particles of the powder material from the vessel.

DESCRIPTION OF THE PREFERRED EMBODIMENT

Figure 1A:
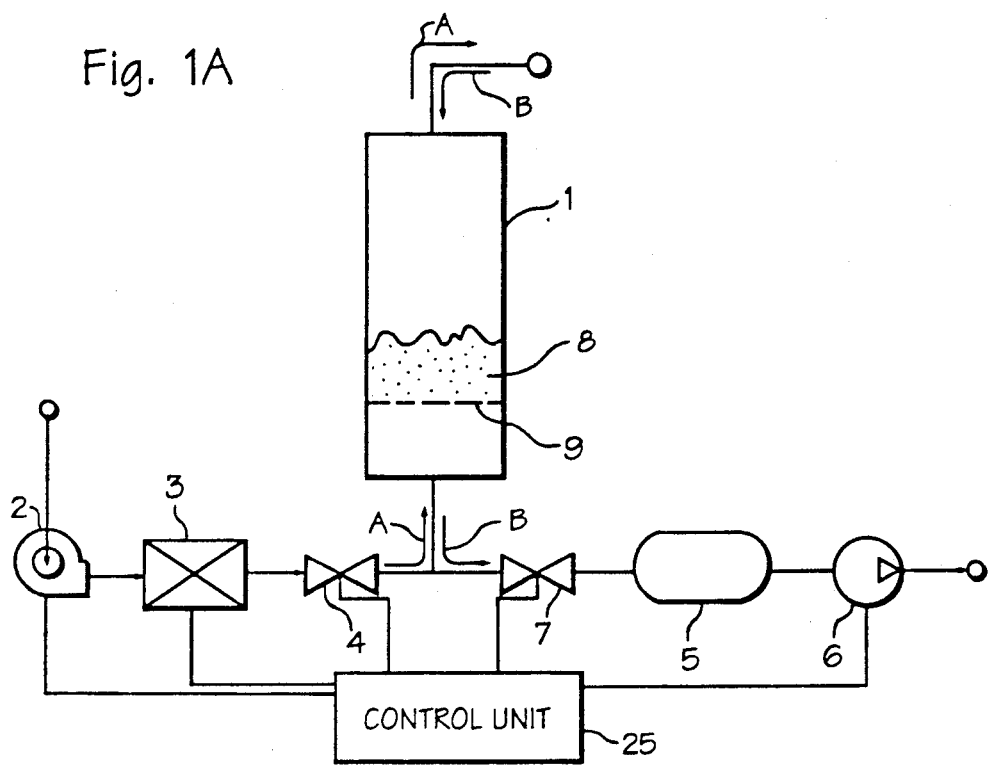
FIG. 1A is a schematic view illustrating one embodiment of dry granulating apparatus and method according to the present invention.

Referring now to the accompanying drawings and initially to FIG. 1, there is schematically illustrated a representative granulating apparatus suitably constructed and arranged for performing the method of the present invention. The granulating apparatus and method utilizes a fluidized bed granulator of the essentially conventional type having a substantially cylindrical upright hollow vessel 1 with a screen or other perforated wall 9 disposed horizontally within the lower region of the vessel 1 to define thereabove a work area wherein a quantity of charge material 8 in powder form may be supported on the screen 9. Fluidized bed granulators of this basic type are well known to those persons skilled in the art and, therefore, for sake of simplicity of illustration and description, the granulator vessel is described and illustrated herein only to the extent necessary to facilitate an enabling disclosure and understanding of the present invention. While not illustrated in FIG. 1A, the vessel 1 is provided with an appropriate powder material inlet and a suitable granulated product discharge outlet.

According to the embodiment of the present invention shown in FIG. 1A, the lower interior area of the vessel 1 beneath the screen 9 is communicated with the pressure discharge side of a blower 2 through a selectively openable and closeable valve 4 and a moisture vapor control unit 3. Similarly, the lower area of the vessel 1 is also communicated through a similar valve 7 with a gas storage or holding tank 5, which, in turn, is communicated with the suction side of a vacuum pump 6. The opposite upper end of the vessel 1 is communicated to atmosphere or to a suitable filtering unit (not shown) through appropriate gas conduits (only schematically illustrated). The actuation and deactuation of the blower 2, the valves 4, 7 and the vacuum pump 6 are controlled from a common control unit, shown only schematically at 25, which for example may be any form of conventional programmable controller, microprocessor or the like.

In accordance with the present invention, the control unit 25 repeatedly opens and closes the valve 4 associated with the blower 2 in alternation with opening and closing of the valve 7 associated with the vacuum pump 6. The blower 2 may be continuously actuated through the control unit 25 or may be repeatedly actuated and deactuated simultaneously with opening and closing of its associated valve 4. Likewise, the vacuum pump 6 may be continuously actuated or may be periodically actuated and deactuated shortly in advance of each opening of its associated valve 7 to evacuate the gas holding tank 5. Thus, whenever the valve 4 is opened, the valve 7 is closed, whereby a pressurized stream of air from the blower 2 is directed upwardly through the vessel 1 and discharged to atmosphere, a filtration unit, or elsewhere, as desired, as indicated by the directional arrows A. As a result, the powder charge material 8 is fluidized above the screen 9 within the work area of vessel 1, causing the powder material 8 to be circulatorily suspended within the work area in a turbulent rolling fashion. Alternatively, when the valve 4 is closed, the valve 7 is opened, whereby the vacuum created within the gas holding tank 5 by the vacuum pump 6 causes an ambient air stream to be drawn downwardly through the vessel 1, the powder material 8 and the valve 7 and into the holding tank 5, as indicated by the directional arrows B, the force of the air stream B causing the charge material 8 to be compressively compacted against the screen 9.

As a result of the natural cohesive properties of the powder charge material, the compressive forces exerted by the air stream B cause the powder material to form into cohesive agglomerates. Then, when the valve 7 is closed to terminate the compressive air flow B and the valve 4 opened, the fluidizing motion of the powder material 8 under the influence of the upward air flow A causes the agglomerates to impact one another, breaking up larger agglomerates and compacting smaller agglomerates. As the compacting and fluidizing steps continue repeatedly and alternately, the agglomerates gradually are formed into relatively densely compacted granules of a substantially spherical shape, with the uniformity in shape and size of the granules progressively increasing with the overall elapsed time of processing.

With powder materials which have little or no cohesive character, it is preferable to actuate the moisture control unit, also operated from the control unit 25, during actuations of the blower 2 in order to inject into the fluidizing air stream A a controlled content of moisture in vapor form. The moisture within the fluidizing air flow A is absorbed by the powder material 8 thereby increasing the cohesive properties thereof to enable granulation of the powder material to progress in the manner described above. Preferably, water vapor or an organic solvent vapor is utilized for this purpose.

As those persons skilled in the art will recognize and understand, the physical characteristics of the granules produced by the present apparatus and method, particularly the granule size, density, and uniformity, are to at least a certain extent dependent upon and a function of the physical properties of the powder raw material, e.g., the average particle size of the powder material, the uniformity in particle size of the raw powder material, the cohesive characteristics of the raw powder material, etc. Nevertheless, through the control unit 25, the physical characteristics of the granules produced under the present invention may be controlled and varied by selective adjustment and variation of the operating parameters of the present method and apparatus, such as the rate of the fluidizing air flow A created by the blower 2, the pressure exerted on the charge material 8 by the compressive air flow B, the elapsed time of each fluidizing actuation of the blower 2, the elapsed time of each material compacting deactuation of the blower 2, and the overall elapsed time over which the granulation process is performed. By selectively varying these operational parameters, the average granule size, density and size and shape uniformity may be selectively controlled within the outer limits imposed by the physical characteristics of the raw material. This control capability of the present invention is reflected by the chart set forth below in which is compiled data and measurements obtained from initial experimental runs of the present invention using differing powder raw materials:

| POWDER RAW MATERIAL | FERRITE | ALUMINA |
|---|---|---|
| Mean Particle Size of Raw Material (μm) | 0.9 | 0.5 |
| Granule Mean Diameter (mm) | 0.35 | 0.5 |
| Charge Raw Material Batch Weight (grams) | 450 | 450 |

| POWDER RAW MATERIAL | FERRITE | ALUMINA |
| --- | --- | --- |
| Yield (% Granules Within Specified Diameter Range) | 80% within 0.2mm-0.5mm | 90% within 0.3mm-0.7mm |
| Fluidizing Air Flow Rate (m³/min) | 0.27 | 0.15 |
| Reverse Compacting Air Pressure (kg/cm² · G) | 0.02 | 0.02 |
| Elapsed Time, Each Fluidizing Air Flow A (Interval Time Between Successive Compacting Air Flows B) (sec) | 15 | 15 |
| Elapsed Time, Each Compacting Air Flow B (sec) | 1 | 1 |
| Total Granulation Time (min) | 300 | 540 |

Those persons skilled in the art will readily recognize and understand that the basic method of the present invention of granulating powder material in dry form substantially without the addition of any agglomerating liquid or binder by repeatedly alternating fluidization and compaction of a dry powder raw material may be performed utilizing numerous other granulating apparatus than the apparatus of FIG. 1A. By way of example and without limitation, alternative embodiments of the present apparatus and method are shown in FIGS. 1B, 2A, 2B, 3A, 3B and 4-9.

Figure 1B:
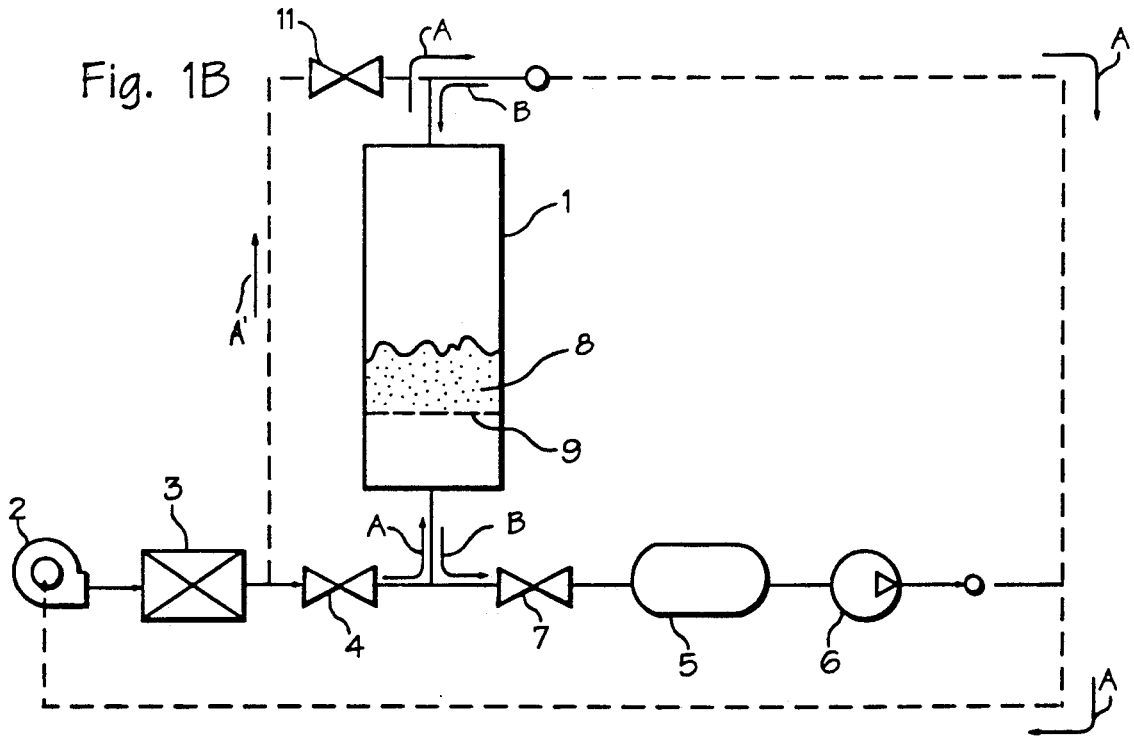
FIG. 1B is another schematic view, similar to FIG. 1A, illustrating an alternative embodiment of the present apparatus and method.

FIG. 1B illustrates a granulating apparatus which basically is identical to that of FIG. 1A, with the addition of a fluid recycling conduit system, shown in broken lines, for recirculating the gaseous fluid utilized for fluidizing and compacting the powder raw material 8. The recycling conduit system includes an additional valve which is opened and closed simultaneously with respective opening and closing operations of the valve 7. Thus, with the valve 7, 11 closed and the blower 2 actuated with its associated valve 4 open, fluidizing air flows upwardly through the vessel 1 and is recirculated back to the blower 2, as indicated by the directional arrows A. To produce an opposite compressive air flow downwardly through the vessel 1, the vacuum pump 6 is operated to evacuate the gas holding tank 5 while fluidizing air flow continues, after which the valves 7 and 11 are opened simultaneously with closing of the valve 4 with the blower 2 continuing in operation. The air output of the blower 2 is then primarily circulated outside the vessel 1 through the recycling conduit system along the conduit leg A' and the recycling conduit legs A, while the vacuum created in the holding tank 5 by the vacuum pump 6 creates a suction draw to divert a portion of the blower-impelled air flow downwardly through the vessel as indicated by the directional arrows B.

Thus, this embodiment essentially forms a completely closed granulating system utilizing a finite self-contained quantity of a gaseous fluid both for fluidization and compaction of the powder material 8. As such, a gaseous fluid other than air, if desirable, may advantageously be utilized for the granulation process. In such cases, an inert gas such as nitrogen would be preferred. In this embodiment, a control unit such as the control unit 25 of FIG. 1A is also utilized to control the moisture control unit 3, the vacuum pump 6, and opening and closing movements of the valves 4, 7, 11, but for simplicity of illustration, the control unit is not shown in the drawing.

Figure 2A:
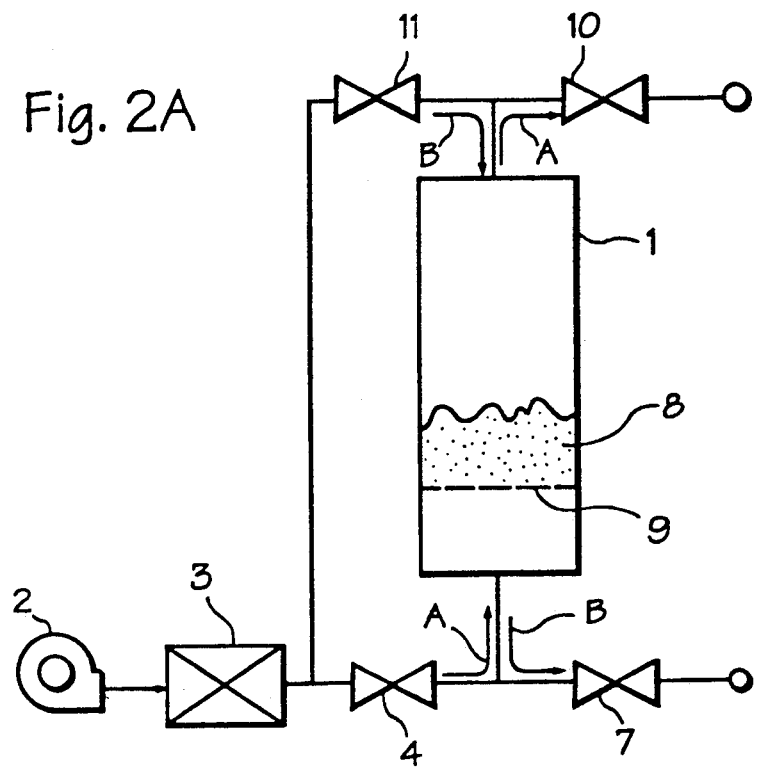
FIG. 2A is a schematic view illustrating another embodiment of dry granulating apparatus and method according to the present invention.
Figure 2B:
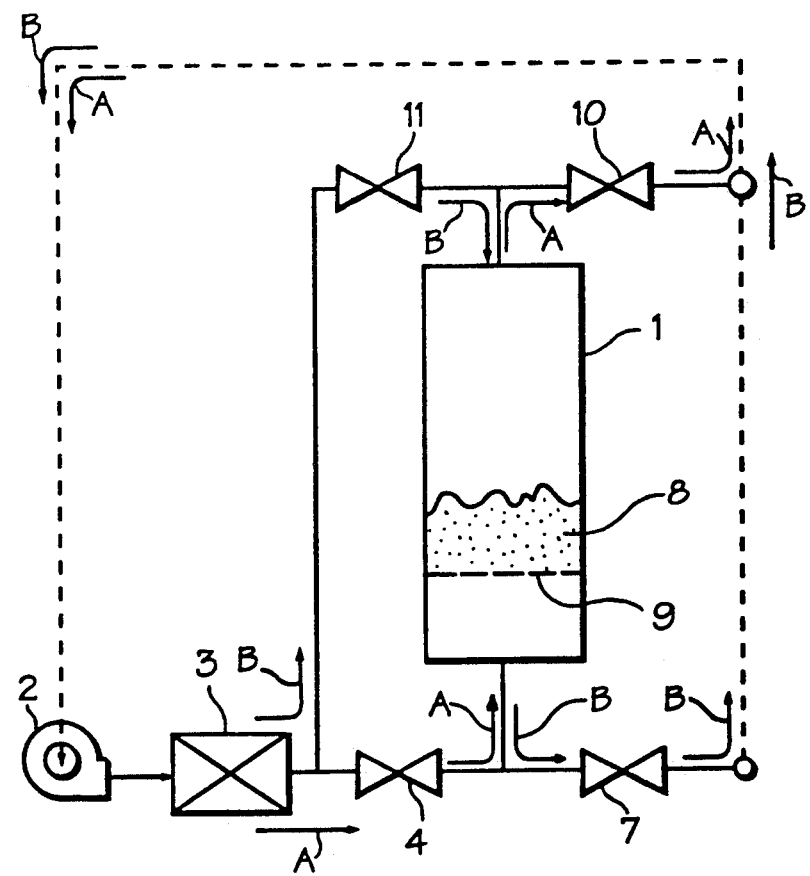
FIG. 2B is another schematic view, similar to FIG. 2A, illustrating an alternative embodiment of the present apparatus and method.

In the embodiment of FIG. 2A, the blower 2 is arranged in a fluid conduit system having a pair of simultaneously openable and closeable fluidizing valves 4, 10 alternately operable with simultaneously openable and closeable material compaction valves 7, 11 to enable the pressurized fluid output of the blower 2 to be utilized for both fluidization and compaction of the charge material 8 within the vessel 1. Specifically, with the valves 4 and 10 open while the valves 7 and 11 are closed, the pressurized fluid output of the blower 2 is directed upwardly through the vessel 1 to fluidize the powder material 8, as indicated by the directional arrows A. Alternatively, with the valves 4, 10 closed and the valves 7, 11 open, the blower output is directed downwardly through the vessel 1 as indicated by directional arrows B to compress the powder material 8 against the screen 9. FIG. 2B illustrates a modified embodiment of the granulating apparatus of FIG. 2A, wherein recycling conduits shown in broken lines are provided to form a closed fluid flow system for continuous recirculation of a finite quantity of granulating fluid. In the case of each of the embodiments of FIG. 2A and 2B, the use of the blower 2 to generate both the fluidizing and compaction air flows A, B maintains the work area within the vessel 1 at an elevated pressure above atmospheric pressure throughout the entirety of the granulating operation. As in FIG. 1A, a control unit (not shown) is provided to control opening and closing of the valves 4, 7, 10, 11 and to control operation of the blower 2 and the moisture control unit 3 in each embodiment.

Figure 3A:
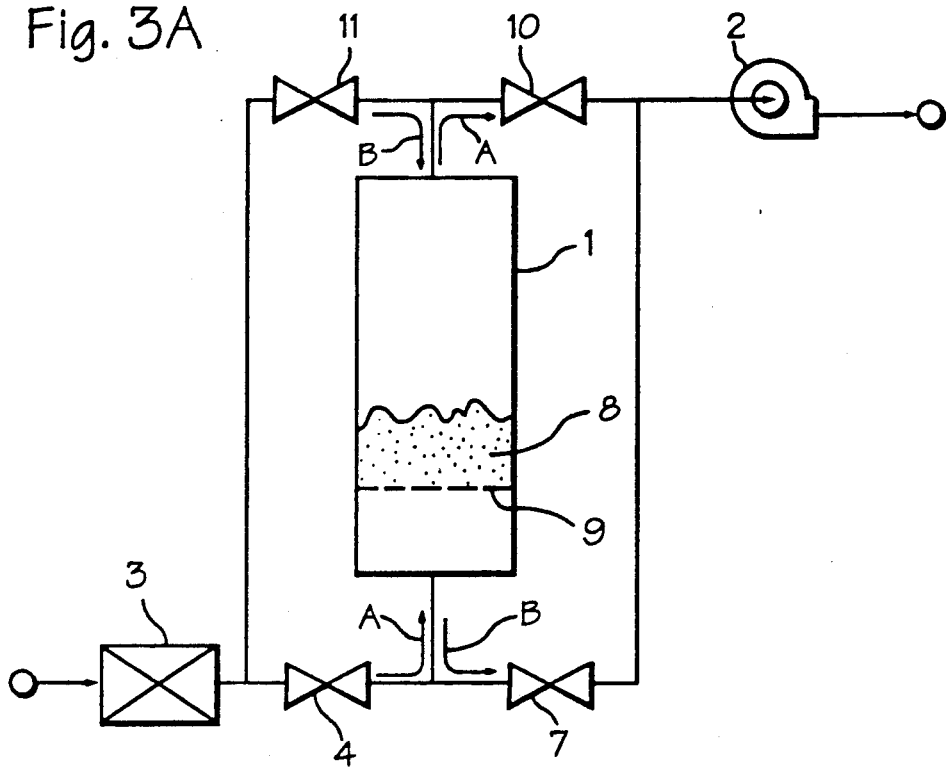
FIG. 3A is a schematic view illustrating another embodiment of dry granulating apparatus and method according to the present invention.
Figure 3B:
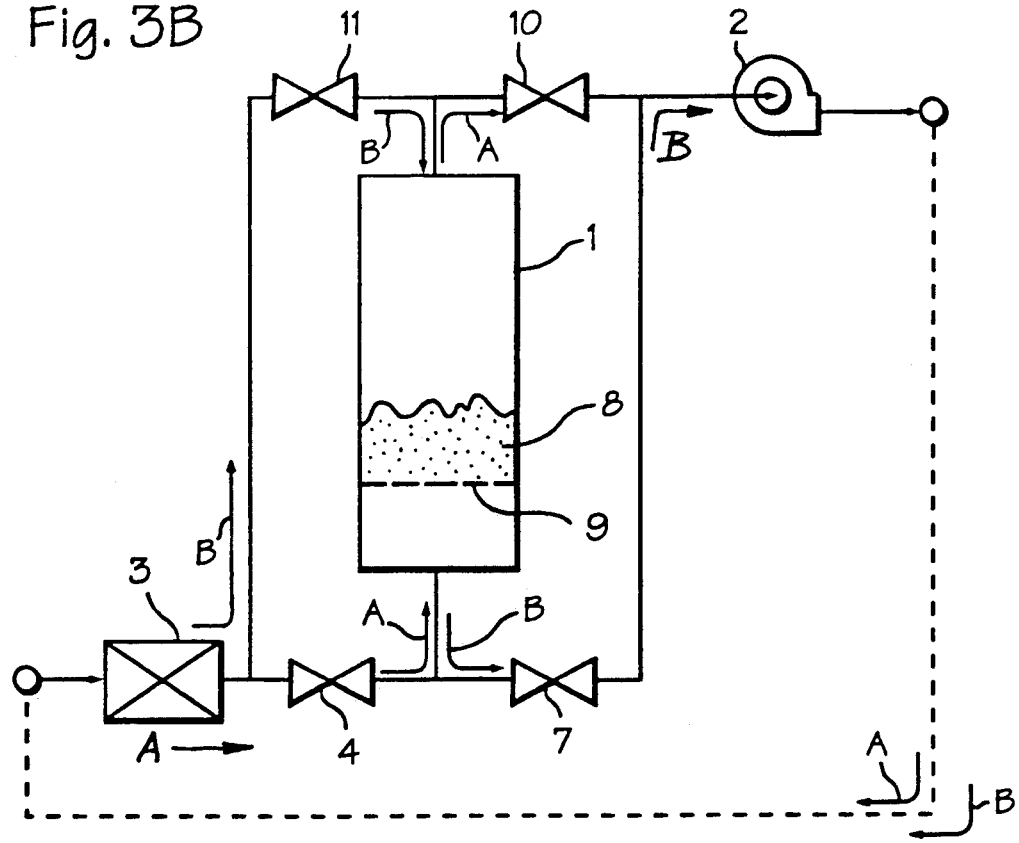
FIG. 3B is another schematic view, similar to FIG. 3A, illustrating an alternative embodiment of the present apparatus and method.

The granulating apparatus in the embodiment of FIG. 3A is substantially similar to that of FIG. 2A, except that the blower 2 is situated in the fluid flow conduit system to generate the fluidizing and compaction air flows A, B by suction rather than by pressurization. Specifically, in this embodiment, upon simultaneous opening of fluidizing valves 4,10 while simultaneously closing compaction valves 7, 11, the blower 2 draws air through the moisture control unit 3 and upwardly through the vessel 1 for fluidizing the charge material 8 therein, as indicated by directional arrows A. Alternatively, simultaneous closing of the valves 4, 10 while opening the valves 7, 11, air drawn by the blower 2 through the moisture control unit 3 is diverted to flow downwardly through the vessel 1 to compress the powder material 8 against the screen 9, as indicated by the directional arrows B. The granulating apparatus illustrated in the embodiment of FIG. 3B is substantially the same as the apparatus of FIG. 3A, with the addition of a recycling conduit system shown in broken lines to form a closed fluid flow system. In each of the embodiments of FIGS. 3A and 3B, the fluid pressure within the work area of the granulating vessel 1 is maintained below atmospheric pressure throughout the granulating operation. Hereagain, a control unit (not shown) is provided to control operation of the blower 2, the moisture control unit 3, and the valves 4, 7, 10, 11, in each embodiment.

Figure 4:
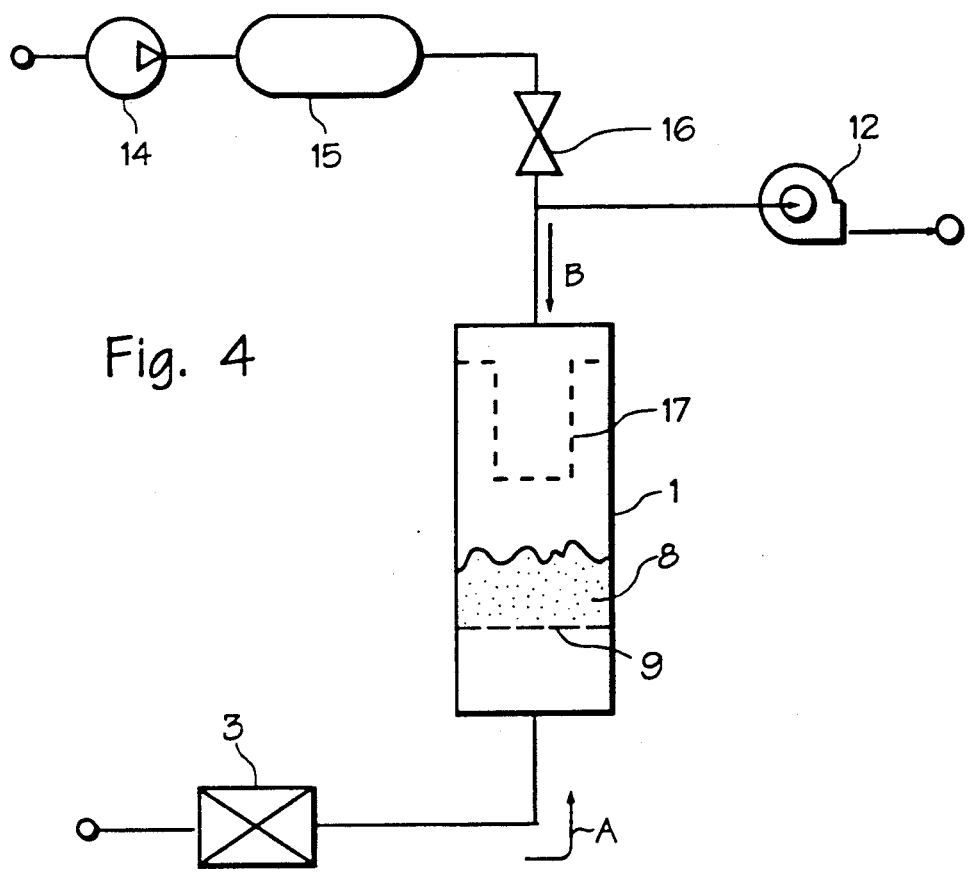
FIG. 4 is a schematic view illustrating a further embodiment of dry granulating apparatus and method according to the present invention.

FIG. 4 illustrates a further embodiment of the granulating apparatus according to the present invention. As in the embodiments of FIGS. 3A and 3B, the suction side of a blower 12 is communicated with the upward end of the granulating vessel 1 to draw a fluidizing air flow A upwardly through the vessel 1 to circulate the powder material 8 supported on the vessel screen 9. In this embodiment, the pressure side of a compressor 14 is communicated with a gas holding tank 15 which, in turn, is also communicated with the upper end of the vessel 1 through a valve 16. The valve 16 is normally closed for fluidization of the powder material 8 in the vessel 1. Alternatively, to create a compressive downward air flow B through the vessel 1 at periodic intervals, the compressor 14 is operated to charge the holding tank 15 with compressed air or another compressed gas from a suitable source, following which the valve 16 is opened while the blower 12 remains in operation. For optimum operation, the holding tank 15 is of a relevantly large capacity in this embodiment. The capacity of the blower 12, in contrast, is insufficient to draw more than a relatively insignificant proportion of the pressurized gas flowing from the holding tank 15 through the open valve 16, whereby the predominant flow of pressurized gas is downwardly through the granulating vessel 1 as indicated by the directional arrow B. FIG. 4 also illustrates the optional provision of a conventional bag-type filter 17 within the upper end of the granulating vessel 1 to prevent fine particles of the powder material 8 from being drawn from the vessel 1 through the blower 12. A suitable control unit (not shown) is also provided in this embodiment.

Figure 5:
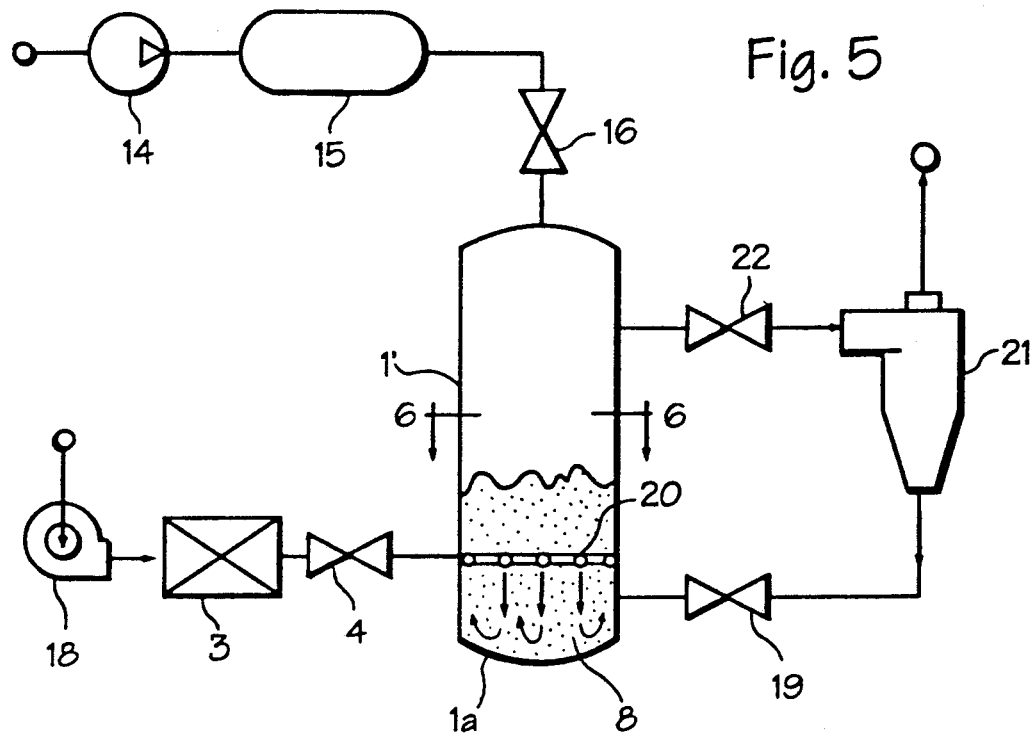
FIG. 5 is a schematic view illustrating a further embodiment of dry granulating apparatus and method according to the present invention.
Figure 6:
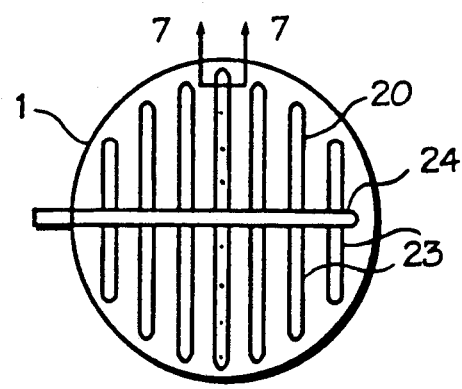
FIG. 6 is a horizontal cross-sectional view of the granulating vessel in the apparatus of FIG. 5, taken along line 6—6 thereof, showing the fluidizing grid assembly in top plan view.
Figure 7:
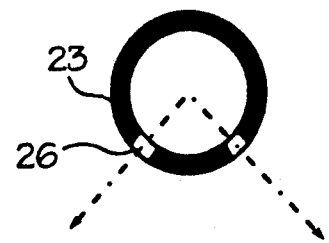
FIG. 7 is a vertical cross-sectional view of one fluid discharge pipe in the fluidizing grid assembly of FIG. 6, taken along line 7—7 thereof.

FIG. 5 illustrates an embodiment of the present granulating apparatus utilizing a differing form of fluid bed granulating vessel 1'. In contrast to the granulating vessels 1 of the above-discussed embodiments, the vessel 1' is not equipped with a horizontal screen or perforated plate for supporting the powder charge material 8 but instead has a concave bottom interior wall 1a for containing the powder material within the lowermost area of the vessel 1'. A fluidizing grid assembly 20, shown in greater detail in FIGS. 6 and 7, is disposed at a spacing above the concave bottom wall 1a and basically includes a series of discharge pipes 23 supplied with fluidizing air flow through a common manifold 24 communicated through a valve 4 and a moisture control unit 3 with the pressure side of a blower 18. Each discharge pipe 23 is provided with a series of openings 26 spaced along its length, which openings 26 face downwardly within the interior of the vessel 1' in angular relation to the bottom concave wall 1a of the vessel 1'. Thus, with the valve 4 open, the pressurized gaseous output of the blower 18 is directed through the grid 20 angularly downwardly within the vessel 1' toward its concave bottom wall 1a off which the gaseous fluid is deflected upwardly to fluidize the powder material 8 contained within the vessel 1'. The pressure side of a compressor 14 is communicated with a relatively large capacity gas holding tank 15 which communicates through a valve 16 with the interior of the granulating vessel 1' at its upper end. Thus, to apply a downward compressive air flow through the vessel 1', the compressor 14 is initially actuated to charge the holding tank 15 with a large capacity of pressurized air or another gas while the valve 16 remains closed. Then, the valve 4 is closed while the valve 16 is opened, permitting the pressurized gas within the holding tank 15 to discharge downwardly through the vessel 1' to compress the powder material 8 against the concave bottom wall 1a. A control unit (not shown) is also provided in this embodiment.

FIG. 5 also illustrates the provision of a conventional dust collector 21 of the type commonly referred to as a cyclone for withdrawing airborne particles of the powder material 8 from the upper end of the granulating vessel 1' through a valve 22 communicating with the inlet to the cyclone 21 and for returning powder material collected in this manner to the bottom of the vessel 1' through a valve 19 communicated with the discharge side of the cyclone 21.

Figures 8, 9:
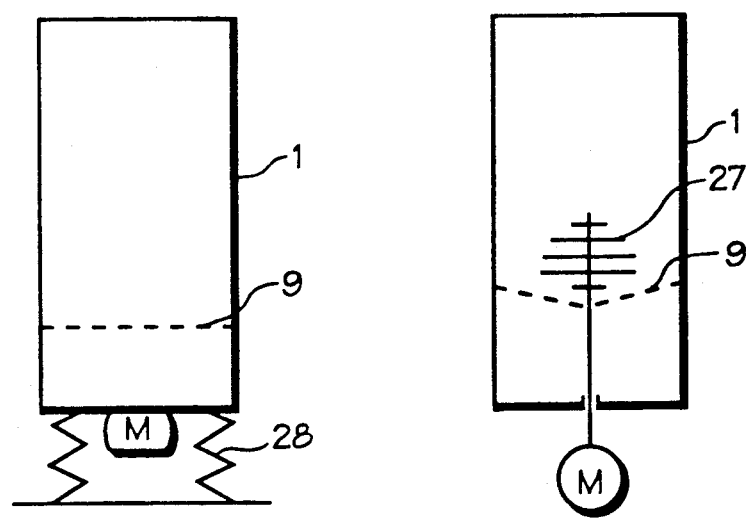
FIGS. 8 and 9 are schematic views of alternative embodiments of fluidizing vessels for use in the apparatus and method of the present invention.

FIGS. 8 and 9 illustrate other forms of granulating vessels 1 equipped with arrangements for agitating powder charge material within the vessel 1. Each of the vessels 1 in FIGS. 8 and 9 is of the same basic type as the granulating vessel 1 of FIGS. 1A, 1B, 2A, 2B, 3A, 3B and 4 including an upright cylindrical housing 1 with a screen or perforated plate 9 disposed horizontally within the lower region of the vessel interior for supporting thereon a powder charge material. In the embodiment of FIG. 8, the vessel 1 is supported on springs 28 or a similar resilient yieldable supporting means and a motor M is connected to the vessel 1 to vibrate the vessel 1 and thereby agitate the powder material to contribute to fluidizing charge material supported on the screen 9. In the embodiment of FIG. 9, the vessel 1 is mounted in a conventional stationary fashion and is equipped with an agitator bar 27 disposed within the material work area of the vessel interior directly above the screen 9, the agitator bar 27 being connected to an agitating motor M exteriorly of the vessel 1 for manipulating the bar 27 to agitate and fluidize powder material supported on the screen 9. Either of the material agitating arrangements of FIGS. 8 and 9 may be utilized as an adjunct to a fluidized bed granulating apparatus such as in any of the above-described embodiments or, in suitable cases, may be utilized alone as a means for fluidizing powder material within the vessel 1.

All of the above-described embodiments of the present apparatus and method substantially provide the same advantages. First, the present apparatus and method enables the formation of granules from a raw material in powder form without the need to add an agglomerating liquid or other binder to the powder material. As a result, the granular end product produced by the present invention is of a significantly higher purity than is achieved with a conventional wet-type granulating apparatus and processes. Further, since the present invention produces granules without a liquid binder, no need exists for energy-intensive drying of the granules, which contributes to improved economy in the granulating operation. Moreover, as an additional result, the granules produced by the present invention are typically softer than granules produced in a wet-type granulation process utilizing a liquid binder, whereby the granules are more easily disintegrated into their constituent powder particles when utilized in subsequent processing operations. Thus, in the end use of the granules in mixing, kneading, pressing and like operations, the granules contribute to achieving a more optimal dispersion of the individual powder particles than with conventional wet-type granules. Further, the present invention has been found in initial experiments to produce densely compacted solid (non-hollow) granules which are of greater uniformity both in spherical shape and in diameter than can conventionally be achieved utilizing known granulation apparatus.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A dry granulating method for forming powder materials into substantially spherical granules substantially without applying an agglomerating liquid, said method comprising steps of:
   a) charging a granulating vessel with a quantity of substantially dry powder material, and
   b) compressively compacting said powder material within said vessel into cohesive agglomerates, and
   c) fluidizing said powder material within said vessel for circulating said powder material to form said agglomerates gradually into a substantially spherical shape, said fluidizing comprising conveying a gaseous fluid within said vessel.

2. A dry granulating method according to claim 1 wherein said compacting step comprises conveying a gaseous fluid within said vessel for compressing said powder material.

3. A dry granulating method according to claim 2 wherein at least one of said compacting gaseous fluid and said fluidizing gaseous fluid have a predetermined content of moisture.

4. A dry granulating method according to claim 3 wherein said moisture comprises water vapor.

5. A dry granulating method according to claim 3 wherein said moisture comprises an organic solvent vapor.

6. A dry granulating method according to claims 1, 2 or 3 wherein said gaseous fluid comprises a gas which is inert with respect to said powder material.

7. A dry granulating method according to claim 6 wherein said gaseous fluid is air or nitrogen.

8. A dry granulating method according to claim 2 wherein the step of conveying a gaseous fluid for compacting said powder material comprises directing a pressurized flow of said gaseous fluid into said vessel.

9. A dry granulating method according to claim 2 wherein the step of conveying a gaseous fluid for compacting said powder material comprises drawing a flow of said gaseous fluid into said vessel by suction.

10. A dry granulating method according to claim 2 wherein the step of conveying a gaseous fluid for fluidizing said powder material comprises directing a pressurized flow of said gaseous fluid into said vessel.

11. A dry granulating method according to claim 2 wherein the step of conveying a gaseous fluid for fluidizing said powder material comprises drawing a flow of said gaseous fluid into said vessel by suction.

12. A dry granulating method according to claim 2 and further comprising providing said vessel with a work surface for supporting said powder material, the step of conveying a gaseous fluid for compacting said powder material comprising causing said gaseous fluid to flow in a direction to compress said powder material against said work surface and the step of conveying a gaseous fluid for fluidizing said powder material comprising causing said gaseous fluid to flow in a direction to transiently suspend and circulate said powder material above said work surface.

13. A dry granulating method according to claim 2 and further comprising recirculating a common quantity of gaseous fluid for us in said compacting step and in said fluidizing step.

14. A dry granulating method according to claim and further comprising performing said compacting step and said fluidizing step alternately.

15. A dry granulating method according to claim 14 and further comprising performing said compacting step at least once.

16. A dry granulating method according to claim 15 and further comprising repeatedly performing alternately said compacting step and said fluidizing step.

17. A dry granulating method according to claim 16 and further comprising controlling the interval between successive performances of the compacting step and the elapsed time of each said compacting step and controlling the total elapsed time of performing said granulating method for controlling the average size, shape and uniformity of the granules produced.

18. A dry granulating method according to claim 2 and further comprising controlling the flow rate of the fluidizing gaseous fluid and the compacting pressure of the compacting gaseous fluid for controlling the average size, shape and uniformity of the granules produced.

19. A dry granulating method according to claim wherein said fluidizing step comprises mechanically agitating said powder material.

20. Dry granulating apparatus for forming powder materials into substantially spherical granules substantially without applying an agglomerating liquid, said apparatus comprising:
   a) a granulating vessel for containing a quantity of substantially dry powder material;
   b) means for compressively compacting said powder material within said vessel into cohesive agglomerates; and
   c) means for fluidizing said powder material within said vessel for circulating said powder material to form said agglomerates gradually into a substantially spherical shape, said fluidizing means including means for conveying a gaseous fluid within said vessel.

21. Dry granulating apparatus according to claim 20 wherein said vessel comprises a fluidized bed granulating vessel and said compacting means comprises means for conveying a gaseous fluid within said vessel for compressing said powder material.

22. Dry granulating apparatus according to claim 21 wherein said compacting means comprises means for directing a pressurized flow of said gaseous fluid into said vessel.

23. Dry granulating apparatus according to claim 21 wherein said compacting means comprises means for drawing a flow of said gaseous fluid into said vessel by suction.

24. Dry granulating apparatus according to claim 21 and characterized further in that said fluidizing means comprises means for directing a pressurized flow of said gaseous fluid into said vessel.

25. Dry granulating apparatus according to claim 21 wherein said fluidizing means comprises means for drawing a flow of said gaseous fluid into said vessel by suction.

26. Dry granulating apparatus according to claim 21 wherein said vessel comprises a work surface, said compacting means comprising means for causing its gaseous fluid to flow in a direction to compress said powder material against said work surface and said fluidizing means comprising means for causing its gaseous fluid to flow in a direction to transiently suspend and circulate said powder material above said work surface.

27. Dry granulating apparatus according to claim 26 wherein said work surface comprises a screen disposed generally horizontally in said vessel for defining with said vessel a work area above said screen.

28. Dry granulating apparatus according to claim 26 wherein said work surface comprises a generally concave bottom interior wall of said vessel and said fluidizing means comprises means for deflecting its gaseous fluid off said concave bottom wall to upwardly fluidize said powder material.

29. Dry granulating apparatus according to claim 28 wherein said deflecting means comprises a grid of fluid discharge pipes having multiple fluid discharge openings oriented angularly with respect to said concave bottom wall.

30. Dry granulating apparatus according to claim 21 and further comprising means for recirculating a common quantity of gaseous fluid between said compacting means and said fluidizing means.

31. Dry granulating apparatus according to claim 20 and further comprising control means for actuating and deactuating said compacting means and said fluidizing means alternately.

32. Dry granulating apparatus according to claim 31 wherein said control means is adapted for actuating said compacting means at least once.

33. Dry granulating apparatus according to claim 32 wherein said control means is adapted for repeatedly actuating and deactuating said compacting means and said fluidizing means alternately.

34. Dry granulating apparatus according to claim 33 wherein said control means comprises means for controlling the interval between successive actuations of said compacting means and the elapsed time of each actuation of said compacting means and for controlling the total elapsed time of operation of said granulating apparatus to control the average size, shape and uniformity of the granules produced.

35. Dry granulating apparatus according to claim 21 wherein said control means comprises means for controlling the flow rate of the fluidizing gaseous fluid and the compacting pressure of the compacting gaseous fluid for controlling the average size, shape and uniformity of the granules produced.

36. Dry granulating apparatus according to claim 20 wherein said fluidizing means comprises means for mechanically agitating said powder material.

37. Dry granulating apparatus according to claim 20 and further comprising means for collecting airborne powder material from said vessel.

38. Dry granulating apparatus according to claim 37 wherein said collecting means comprises filtering means disposed within said vessel.

39. Dry granulating apparatus according to claim 37 wherein said collecting means comprises a cyclone dust collector communicating with the interior of said vessel.

* * * * *

UNITED STATES PATENT AND TRADEMARK OFFICE
CERTIFICATE OF CORRECTION

PATENT NO. : 5,124,100

DATED : June 23, 1992

INVENTOR(S) : Kazuo Nishii, Yoshihiro Itoh, Noboru Kawakami, and Nobuharu Moriya It is certified that error appears in the above-identified patent and that said Letters Patent is hereby corrected as shown below:

Column 7, line 34, after "valve" insert -- 11 --.

Column 7, line 52, after "vessel" insert -- 1 --.

Column 12, line 5, delete "us" and insert therefor -- use --.

Column 12, line 7, after "claim" insert -- 1 --.

Column 12, line 28, after "claim" insert -- 1 --.

Signed and Sealed this

Fifth Day of October, 1993

Attest:

BRUCE LEHMAN

*Attesting Officer*  *Commissioner of Patents and Trademarks*